United States Patent [19]

Jarmon

[11] Patent Number: 4,902,326
[45] Date of Patent: Feb. 20, 1990

[54] METHOD FOR MAKING FIBER REINFORCED GLASS MATRIX COMPOSITE ARTICLE HAVING SELECTIVELY ORIENTED FIBER REINFORCEMENT

[75] Inventor: David C. Jarmon, Kensington, Conn.

[73] Assignee: United Technologies Corporation, Hartford, Conn.

[21] Appl. No.: 266,034

[22] Filed: Nov. 2, 1988

[51] Int. Cl.[4] .............................................. C03C 27/00
[52] U.S. Cl. ...................................... 65/4.1; 65/18.1;
65/18.4; 65/43; 65/901; 264/109; 264/125;
428/113; 501/95
[58] Field of Search ................. 65/4.1, 2, 3.2, 4.21,
65/17, 18.1, 18.4, 901; 264/66, 109, 110, 122,
125, 348; 501/95; 428/113

[56] References Cited

U.S. PATENT DOCUMENTS

| | | | |
|---|---|---|---|
| 4,414,011 | 11/1983 | Layden et al. | 65/18.1 |
| 4,428,763 | 1/1984 | Layden | 65/4.21 |
| 4,464,192 | 8/1984 | Layden et al. | 65/18.1 |
| 4,581,053 | 4/1986 | Prewo et al. | 65/4.21 |

FOREIGN PATENT DOCUMENTS 56-100145 8/1981 Japan ..................................... 65/901

OTHER PUBLICATIONS

J. P. Brazel, R. Fenton, "ADL-4D6: A Silica/Silica Composite for Hardened Antenna Windows".
T. M. Place, "Design Data for AS-3DX Quartz/Silica Composite Material".

Primary Examiner—Robert L. Lindsay

[57] ABSTRACT

A multidirectionally fiber reinforced-glass matrix composite article is disclosed. The fiber reinforcement is precisely oriented in three or more directions to provide high strength and stiffness in each of the three or more directions. A method for making a multidimensionally fiber reinforced glass matrix composite article is also disclosed. The method includes impregnating a fiber preform with a colloidal suspension of inorganic material, cooling the impregnated fiber preform to precipitate the inorganic material, drying the preform, impregnating the preform with heated glass matrix material, and cooling the glass impregnated preform to form the multidirectionally fiber reinforced glass matrix composite article.

5 Claims, 6 Drawing Sheets

3000μm

700μm

700μm

METHOD FOR MAKING FIBER REINFORCED GLASS MATRIX COMPOSITE ARTICLE HAVING SELECTIVELY ORIENTED FIBER REINFORCEMENT

The Government has the rights in this invention pursuant to Contract No. F33615-85-C-2594 awarded by the Department of the Air Force.

TECHNICAL FIELD

This invention pertains to fiber reinforced glass matrix composite articles.

BACKGROUND OF THE INVENTION

Precise orientation of continuous reinforcing fibers is critical to obtaining high performance continuous fiber reinforced glass matrix composite articles. The physical properties of such articles are anisotropic since the reinforcing fibers provide high tensile strength and high stiffness to the composite article in a direction parallel to the long axis of the reinforcing fibers. In order to obtain high tensile strength and high stiffness in more than one direction, it is necessary to orient the fiber reinforcement in more than one direction.

Two dimensionally reinforced glass matrix composite laminates may be made by hot pressing layers of glass impregnated woven fiber cloth or layers of glass impregnated unidirectionally oriented fiber tape as described in commonly assigned U.S. Pat. No. 4,581,053. Such two-dimensionally reinforced articles meet the demands of a wide variety of applications. However, in certain applications articles which exhibit high strength and stiffness in three or more noncoplanar directions are required.

Three-dimensionally reinforced glass matrix composite articles may be made by a compression molding woven fiber preforms wherein the preforms comprise glass slurry coated fibers as described in commonly assigned U.S. Pat. No. 4,581,053 or which comprise glass fibers and reinforcing fibers as described in commonly assigned U.S. Pat. No. 4,613,473. However, compression molding necessarily compacts the woven preform in one direction, and multi-dimensionally reinforced woven fiber preforms cannot be compression molded without buckling or crimping the reinforcing fibers in the direction of compaction.

A method of transfer molding fiber reinforced glass matrix composite articles, described in commonly assigned U.S. Pat. No. 4,428,763 avoids the fiber buckling and fiber crimping problems associated with compression molding processes. In the transfer molding process, the reinforcing fibers are aligned in a mold cavity and heated matrix material is injected into the mold cavity to surround the aligned fibers. The uniform infiltration of a large, tightly woven, fiber preforms with heated glass matrix material has proven to be extremely difficult due to the viscosity of the heated glass matrix material. The severity of the problems encountered increase as the volume fraction of reinforcing fibers increases.

What is needed in the art is method for making continuous fiber reinforced glass matrix composite articles which overcomes the above problems.

DISCLOSURE OF THE INVENTION

The method for making fiber reinforced glass matrix composite articles is disclosed. A fiber preform, wherein the fibers of the preform are disposed in selective orientations is impregnated with a colloidal suspension of inorganic material. The impregnated fiber preform is cooled to precipitate the inorganic material from the suspension and form a rigidized fiber preform. The rigidized fiber preform is dried and the dry rigidized fiber preform is impregnated with the glass matrix material and the glass impregnated fiber preform is cooled to form the fiber reinforced glass matrix composite article, wherein the fibers substantially remain in the selected orientations.

A rotationally symmetrical fiber reinforced glass matrix article is also disclosed. The article comprises a glass matrix reinforced with axially oriented reinforcing fibers, radially oriented reinforcing fibers, and circumferentially oriented reinforcing fibers.

A fiber reinforced glass matrix article having three noncoplanar axes is also described. The article comprises a glass matrix reinforced with longitudinally oriented reinforcing fibers, transversely oriented reinforcing fibers, and out-of-plane oriented reinforcing fibers.

The forgoing and other features and advantages of the present invention will become more apparent from the following description and accompanying drawings.

BEST MODE FOR CARRYING OUT THE INVENTION

Figure 1:
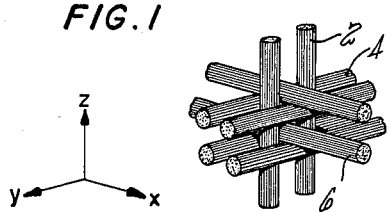
FIG. 1 shows a schematic representation of the fiber reinforcement of an article of the present invention.

FIG. 1 shows a schematic view of the fiber reinforcement in an article of the present invention. Tows of reinforcing fibers are oriented along each of three mutually perpendicular axes. The fiber reinforcement comprises longitudinal fibers 2 oriented in substantial alignment with the z-axis, transverse fibers 4 oriented in substantial alignment with the y-axis and out-of-plane fibers 6 oriented in substantial alignment with the x-axis. The reinforcing fibers extend rectilinearly along each of the respective axes. The reinforcing fibers are not buckled and are not crimped.

Figure 2:
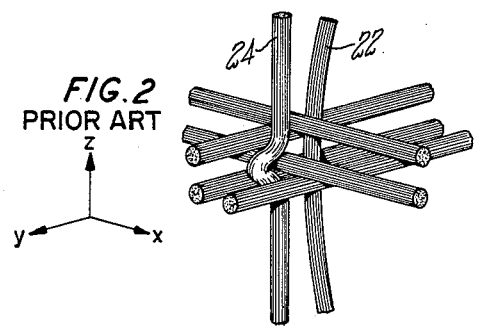
FIG. 2 shows a schematic representation of the fiber reinforcement of a three-dimensionally fiber reinforced glass matrix composite article made by the hot-pressing method of the prior art.

FIG. 2 has a schematic view of the fiber reinforcement in a three-dimensionally reinforced hot-pressed fiber reinforced glass matrix article of the prior art, showing buckled fibers and crimped fibers. The buckled fibers 22 and crimped fibers 24 do no extend rectilinearly along the z-axis due to compression in the z direction during hot pressing. The crimped fibers each include straight portions which are aligned with the z-axis and crimped portions which are not in alignment with the z-axis. The crimped regions concentrate stress and weaken the composite article.

Figure 3:
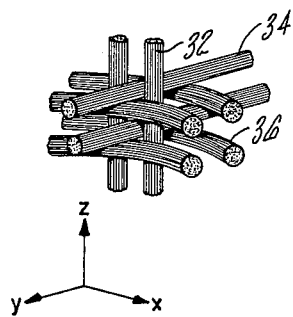
FIG. 3 shows a schematic representation of the fiber reinforcement of a second article of the present invention.

FIG. 3 shows a schematic view of the fiber reinforcement in a second article of the present invention. The second article of the present invention has a central axis of rotational symmetry. The fiber reinforcement comprises axially oriented reinforcing fibers 32 which are substantially aligned with the axis of rotational symmetry, radially oriented reinforcing fibers 34 which radiate substantially perpendicularly from the axis of rotational symmetry and circumferentially oriented reinforcing fibers 36 which concentrically circumscribe the axis of rotational symmetry. The axially oriented reinforcing fibers 32 and radially oriented reinforcing fibers 34 are straight and the circumferentially oriented reinforcing fibers 36 form smooth curves wherein each point of a particular circumferentially oriented reinforcing fiber 36 is equidistant from the axis of rotational symmetry. The reinforcing fibers are not buckled and are not crimped.

Prior art molding methods do not allow the fabrication of thick walled ring-shaped structures with circumferentially oriented reinforcing fibers.

Attempts to fabricate three-dimensionally reinforced glass matrix composite rings by the prior art matrix transfer method had proven unsuccessful due to misalignment of the reinforcing fibers, nonuniform infiltration by the matrix material and compaction of the fiber tows.

Figure 4:
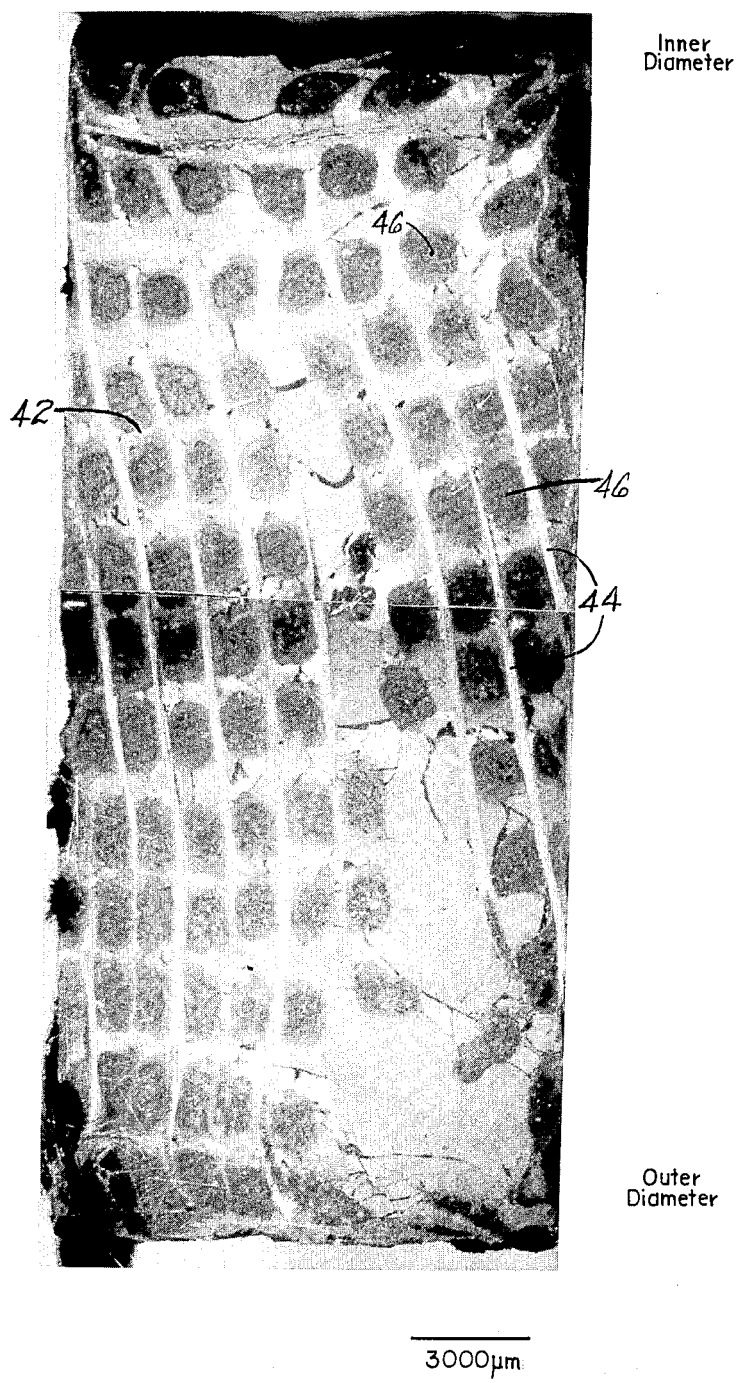
FIG. 4 is a photomicrograph of a cross section of a three-dimensionally fiber reinforced glass matrix composite article made by the matrix injection method of the prior art.

FIG. 4 is a photomicrograph which shows cross section of a three-dimensionally reinforced glass matrix composite ring made by the matrix transfer method of the prior art. The fiber reinforcement includes axial fibers 42, radial fibers 44 and circumferential fibers 46. The fibers have been grossly misaligned by the flow of viscous glass matrix into the woven fiber preform.

Figure 5:
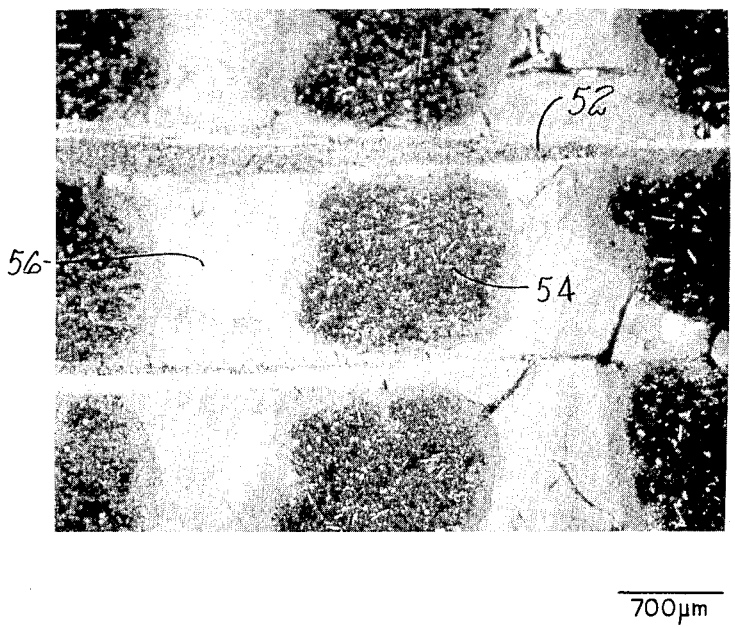
FIG. 5 is a photomicrograph of a cross section of a three-dimensionally fiber reinforced glass matrix article made by the matrix injection method of the prior art.

FIG. 5 is a photomicrograph showing a cross section of a three-dimensionally fiber reinforce glass matrix composite ring made by the matrix injection process of the prior art. Radial fiber tows 52 and cross-sections of circumferential fiber tows 54 are visible in FIG. 5. The circumferential fiber tows 54 exhibit rounded edges and are not fully infiltrated by the glass matrix material. The incomplete infiltration of the fibers by the matrix material compromises the ability of the composite article to transfer load and is detrimental to the performance of the composite article. Large glassy regions 56 separate the rounded compacted circumferential fiber tows 54. The circumferential fiber tows 54 have been compacted into tight bundles by the hydrostatic pressure applied by the injection of the glass matrix material. The result is a highly porous, low strength composite article.

Figure 6:
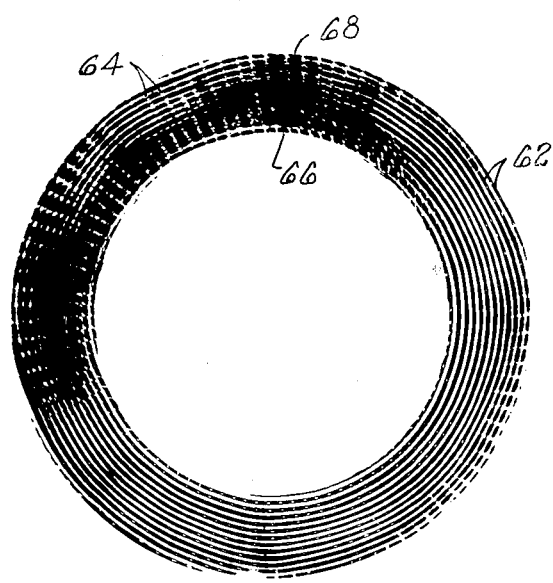
FIG. 6 is an X-ay photograph of a three-dimensionally fiber reinforced glass matrix composite ring of the present invention.

FIG. 6 is an X-ray photograph of a three-dimensionally fiber reinforced glass matrix composite ring of the present invention. The circumferential fibers 62 form smoothly curved concentric rings about the central axis. The radial fibers 64 radiate rectilinearly from the inner diameter 66 to the outer diameter 68.

Figure 7:
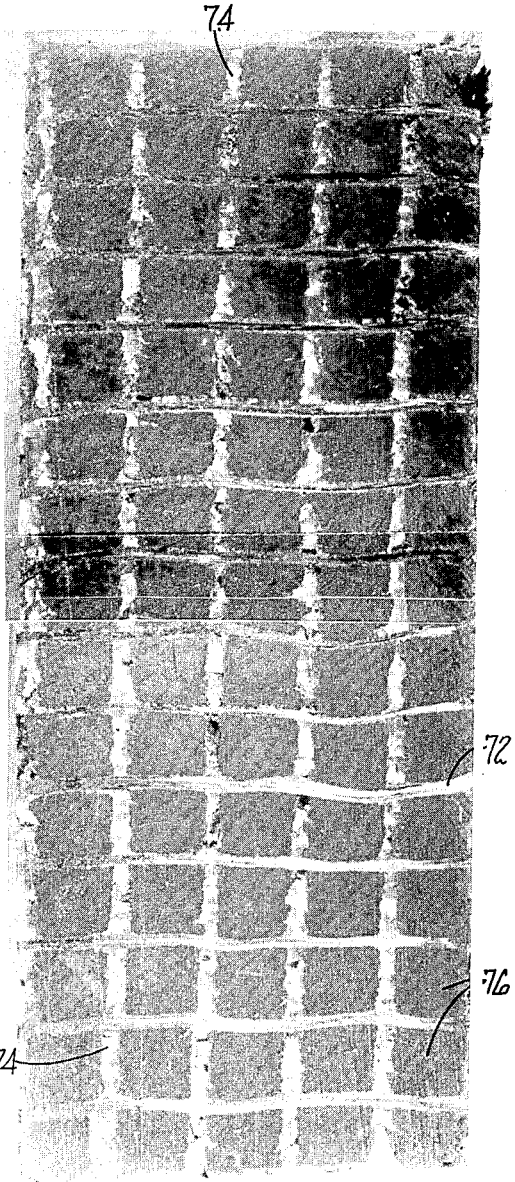
FIG. 7 is a photomicrograph of a cross section of a three-dimensionally fiber reinforced glass matrix composite ring of the present invention.

FIG. 7 is a photomicrograph of a cross section of a three-dimensionally fiber reinforced glass matrix composite ring of the present invention. The fiber reinforcement includes axial fibers 72, radial fibers 74 and circumferential fibers 76. The axial fibers 72 and radial fibers 74 extend rectilinearly. The reinforcing fibers have not been misaligned during matrix transfer.

Figure 8:
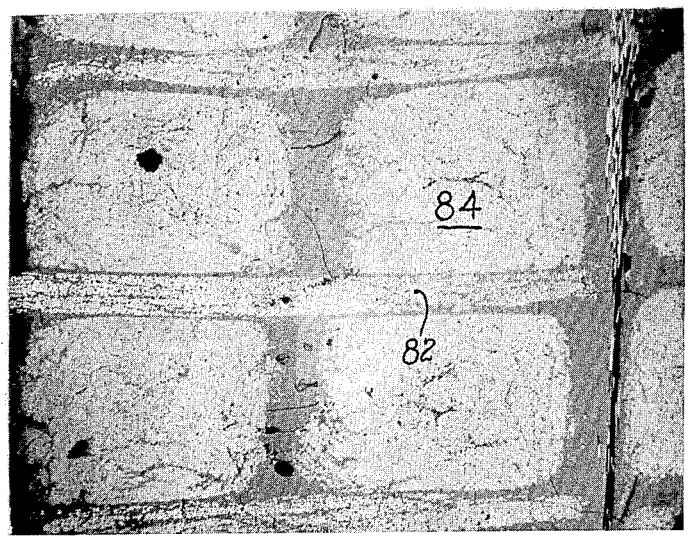
FIG. 8 is a photomicrograph of a cross section of a three-dimensionally fiber reinforced glass matrix composite ring of the present invention.

FIG. 8 is a photomicrograph of a cross section of a three-dimensionally fiber reinforced glass matrix composite ring of the present invention. Radial fiber tows 82 and cross sections of circumferential fiber tows 84 are shown. The tows of circumferential fiber tows 84 are regularly distributed, exhibit square cross sections, are noncompacted and are fully infiltrated by the matrix.

Figure 9:
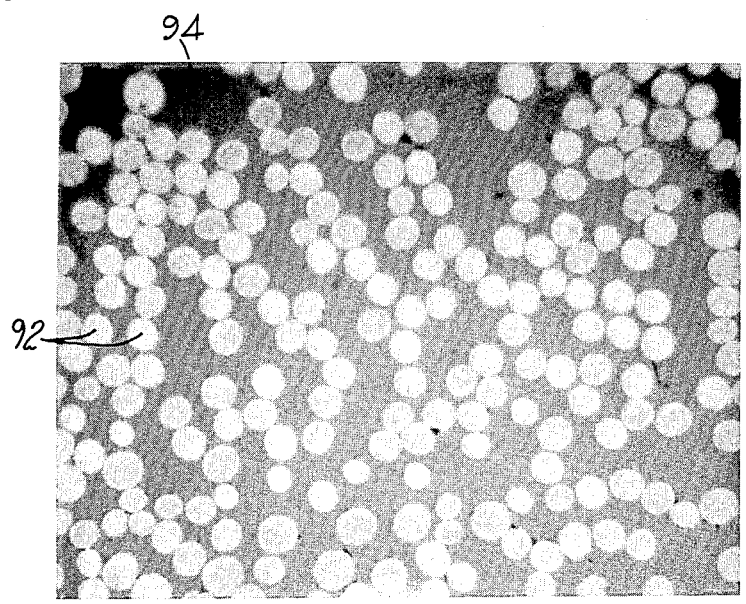
FIG. 9 is a photomicrograph of a cross section of a fiber tow within a fiber reinforced glass matrix composite article of the present invention.

FIG. 9 is a photomicrograph of a cross section of the center of a circumferential fiber tow within a fiber reinforced glass matrix composite article of the present invention. Each of the individual fibers 92 is surrounded by glass matrix material 94. The fiber tow is substantially fully infiltrated with the matrix material. The void volume of the area of the composite article shown in the micrograph was measured at <0.01% by computer image analysis using a Tracor Northern Model 8302 Image Analyzer. The method of the present invention allows fabrication of fiber reinforced glass matrix composite articles which have a high loading of reinforcing fibers, i.e. from about 30 volume % to about 70 volume % fiber, and a low apparent porosity. Apparent porosity is determined by liquid displacement. A low apparent porosity is an apparent porosity of less than about 5 volume and preferably less than about 2 volume %.

The glass matrix material which is introduced to the article by matrix transfer molding is chosen on the basis of its temperature resistance and its chemical and thermal compatibility with the fiber reinforcement. Glasses which are chemically compatible with the fiber reinforcement do not react to substantially degrade the fiber reinforcement during processing. A glass matrix material is thermally compatible with the fiber reinforcement if the coefficient of thermal expansion of the glass and the fiber reinforcement are sufficiently similar that the composite article will not delaminate during thermal cycling due to excessive thermal stresses generated by differential thermal expansion of the glass matrix and the fibers. Borosilicate glass (e.g. Corning Glass Works (CGW) 7070), alumino silicate glass (e.g. CGW 1723) and high silica glass (e.g. CGW 7930) as well as mixtures of glasses are suitable matrix materials. Glass-ceramic materials, such as lithium alumino silicate (LAS) magnesium alumino silicate (MAS), and calcium alumino silicate (CAS), which may be partially crystallized during processing, as well as mixtures of glass ceramic materials and mixtures of glass materials and glass ceramic materials may also be used as the glass matrix material of the present invention. The choice of glass matrix material is dependent upon the particular demands of the intended application. For example borosilicate glass is the preferred glass matrix material for applications which require resistance to temperatures of up to about 550° C., because while its temperature resistance is low in relation to the other glass materials, borosilicate glass is more easily processed than the other glass materials. For applications which require resistance to temperatures of up to about 1200° C., glass ceramic materials, particularly LAS, are preferred matrix materials due to their superior temperature resistance.

The fiber reinforcement of the present invention may comprise any inorganic fiber that exhibits high tensile strength and high tensile modulus at elevated temperatures. Suitable fibers include graphite fibers, silicon carbide fibers, and refractory metal oxide fibers. The choice of a particular fiber material is dependent upon the demands of the intended application. For applications requiring strength, stiffness, and toughness graphite fiber reinforcement is preferred. Magnamyte graphite fiber type HMU (Hercules Incorporated) is a graphite fiber that has been found to be particularly suitable for the practice of the present invention. The HMU fiber is a PAN-based fiber available in 1,000, 3,000, 6,000 and 12,000 filament-count tows with an average fiber diameter of about 8microns. The fiber is normally supplied with a water soluble PVA sizing from proved handling characteristics. The HMU fiber typically exhibits a tensile strength of about 2,758 MPa, a tensile modulus of about 379 GPa and an ultimate elongation of about 0.70%. In applications in which oxidation resistance as well as strength, stiffness and toughness are required silicon carbide fibers are preferred. Nicalon ceramic grade fiber (Nippon Carbon Company) is a silicon carbide fiber that has been found to be particularly suitable for the practice of the present invention. The Nicalon fiber is available in 500 filament tows with an average fiber diameter between 5 and 15 microns and has a tensile strength of about 2,070 MPa and an elastic modulus of about 176 GPa.

A fiber preform comprises an ordered combination of selectively oriented reinforcing fibers. The orientation of each of the fibers may be defined in relation to other reinforcing fibers in the preform or in relation to reference axes. The process of the present invention is particularly useful in the case of woven fiber preforms wherein the reinforcing fibers are disposed in substantial alignment with three or more noncoplanar axes. As previously discussed, the reinforcing fibers of the preform may be moved relative to each other by external forces, i.e. the fibers may be displaced from the desired relative orientations. Fiber tapes, cloths and woven fiber preforms are commercially available from a number of sources, e.g. Fiber Materials, Inc. (Biddeford, Me.), Textron Specialty Materials, Inc. (Lowell, Mass.).

While the present invention is described primarily in the context of continuous fiber reinforced composites, discontinuous fibers, e.g. chopped carbon fibers or SiC whiskers, may also be used in the practice of the present invention.

The glass matrix of an article of the present invention may comprise from about 30 volume % to about 70 volume % of the article. Continuous fiber reinforcement may comprise from about 30 volume % to about 70 volume percent of the article. Alternatively, discontinuous fiber reinforced may comprise between 5 volume percent and 30 volume percent of the composite article.

The process of the present invention includes impregnating a fiber preform with a colloidal suspension of inorganic material, cooling the impregnated fiber preform to precipitate the inorganic material from suspension to form a rigidized fiber preform and then drying the rigidized fiber preform. The dry rigidized fiber preform is then impregnated with heated glass matrix material by a matrix transfer molding process to form a glass impregnated fiber preform and the glass impregnated fiber preform is cooled to form the fiber reinforced glass matrix composite article.

The fiber reform is impregnated with a colloidal suspension of inorganic particles to form a colloid-impregnated fiber preform. The fiber preform is arranged in a mold so that the reinforcing fiber of the preforms are disposed in the desired relative orientations and the preform is submerged in the colloidal suspension of inorganic particles. The submerged fiber preform is subjected to subatmospheric pressure, typically of vacuum of about 20 inches Hg to about 29 inches Hg, to remove entrapped air from the preform. The vacuum is maintained until visible outgassing, i.e. bubbling, ceases. Substantially, the vacuum is typically maintained for a time period of about 1 hour.

The colloidal suspension of the present invention may comprise any colloidal suspension of inorganic particles in a continuous medium. Colloidal suspensions of inorganic particles which have a solid content of less than about 50% by weight, exhibit a viscosity of less than about 50 centipoise at 25° C., and in which the nominal particle size is less than about 100 nanometers (nm) are preferred. Colloidal suspensions of inorganic particles which have a solid content between about 30% by weight and about 40% by weight are particularly preferred. Colloidal suspensions of inorganic particles which exhibit a viscosity of less than about 10 centipoise at 25° C. are particularly preferred. Colloidal suspensions of inorganic particles in which the nominal particle size is less than about 30 nanometers are particularly preferred. Colloidal suspensions of inorganic particles which undergo irreversible precipitation upon cooling to a temperature about equal to or below the freezing point of the continuous medium, e.g. aqueous colloidal suspensions of negatively charged inorganic particles such as aqueous colloidal suspensions of silica, borosilicates, aluminosilicates, or other silicates, are particularly preferred. A grade of colloidal silica known as Ludox AS-40 (DuPont de Nemours, E. I. and Co., Inc.) was found to be particularly suitable for use in the present process. Ludox AS-40 is an ammonium stabilized colloidal suspension of silica which contains 40 weight percent silica particles having a nominal particle size of about 22 nanometers. Ludox AS-40 has a viscosity of about 9 centipoise at 25° C.

The colloid-impregnated fiber preform is cooled to a temperature about equal to or below the freezing point of the continuous medium to precipitate the inorganic particles. Prior to precipitation of the inorganic particles, the fibers of the preform may be moved relative to each other. The precipitated inorganic particles form regions of solid inorganic material which interlock the fibers of the fiber preform and prevent movement of the fibers relative to each other, i.e. an inorganic network which "rigidizes" the fiber preform. The colloid impregnated fiber preform may be cooled rapidly, e.g. by immersion in liquid nitrogen, or may be cooled slowly, e.g. in a temperature controlled chamber that is maintained at a temperature about equal to the freezing point of the continuous medium. Slow cooling is preferable as it appears that slow cooling promotes the formation of a large inorganic platelets.

Figure 10:
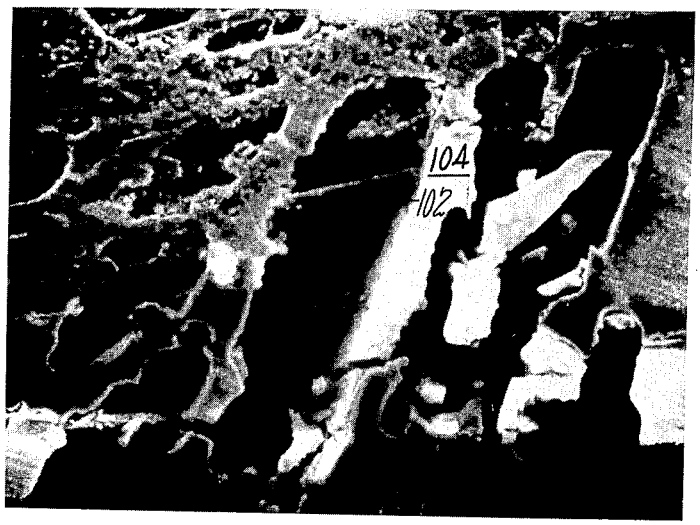
FIG. 10 is a photomicrograph of a cross section of a dry rigidized fiber preform.

If the inorganic particles have been irreversibly precipitated by the cooling step, as in the preferred case of aqueous colloidal suspension of silica, the continuous medium may be removed from the rigidized preform by heating the rigidized preform to evaporate the continuous medium. In the case of an aqueous colloidal suspension, the rigidized preform may be dried by heating the ridigized preform to about 90° C. to evaporate the aqueous medium. Alternatively, the continuous medium may be removed from the rigidized fiber preform by subjecting the rigidized fiber preform to subatmospheric pressure while maintaining the fiber preform at a temperature about equal to or below the freezing point of the continuous medium, i.e. "freeze-drying" the preform. If the inorganic particles have been reversibly precipitated by the cooling step, as, for example, in the case of an aqueous colloidal suspension of zirconia, freeze-drying appears to be the only choice, since heating the rigidized fiber preform would result in reversion of the precipitate to the colloidal suspension. Heating the preform to evaporate the continuous medium, and thus the use of colloidal suspensions which irreversibly precipitate upon cooling, is preferred as the simpler and less expensive alternative. FIG. 10 is a photomicrograph of a section of an exemplary dry rigidized fiber preform. Reinforcing fibers 102 are interconnected by silica platelets 104.

The dry rigidized fiber preform is then impregnated with the glass matrix material according to the method of commonly owned U.S. Pat. No. 4,428,763. Matrix transfer is continued at a rate that is slow enough to avoid fiber movement, until a calculated void volume of less than about 5% is achieved. The platelets fuse with the glass matrix material during consolidation.

EXAMPLE

A three-dimensionally woven graphite (HMU, Hercules, Inc.) fiber preform was obtained from Fiber Materials Incorporated (Biddeford, Me.). The fiber preform was in the form of a ring with an outer diameter of 8.2 inches, an inner diameter of 5.764 inches and a height of 0.50 inches. The fiber preform comprised axially oriented reinforcing fibers which were substantially aligned with the axis of rotational symmetry of the ring, radially oriented reinforcing fibers which radiated a substantially perpendicularly from the axis of rotational symmetry and circumferentially oriented reinforcing fibers which concentrically circumscribed the axis of rotational symmetry. Details regarding the dimensions, yarn spacing, filament count, and relative volume of each fiber orientation are given in Table 1.

TABLE 1

| Dimensions (inches) | |
| --- | --- |
| Inner diameter | 5.76 |
| Outer diameter | 8.2 |
| Thickness | 0.5 |
| Yarn Spacing (inch) | |
| Radial | 0.031 to 0.029 |
| Circumferential | 0.180 to 0.255 |
| Axial | 0.120 |
| Filament Count per Site | |
| Radial | 12,000 |
| Circumferential | 18,000 |
| Axial | 6,000 |
| Fiber Volume % of Total Fiber Volume | |
| Radial | 9 to 6 |
| Circumferential | 75 to 81 |
| Axial | 17 to 12 |
| Total Fiber Volume % of Preform Volume | 40 |

The woven preform was placed in an aluminum fixture and fired for 8 hours at 400° C. in air to thermally decompose the acrylic binder in the preform and the polyvinyl acetate sizing on the fibers. The acrylic binder was in the preform to render the preform machinable and handleable. PVA sizing was on the fiber to make it handleable during weaving. The weight of the air fired preform was 153.4 grams.

The preform was placed in a container, and the container was filled with Ludox AS-40 colloidal silica (E. I. du Pont de Nemours & Company, Inc.). The colloidal silica completely cover the preform in alumina fixture. The submerged preform was placed in a vacuum chamber and a vacuum of 26 inches of mercury was drawn. The preform was submerged in the colloidal silica under vacuum for one hour to impregnate the fiber preform with colloidal silica.

The container was removed from the vacuum chamber and placed in a freezer at 0° C. for 16 hours to precipitate the silica to form a rigidized fiber preform.

The container was then placed in an over at 90° C. for 16 hours to dry the rigidized fiber preform. After drying, the rigidized preform was removed from the aluminum fixture. The rigidized preform weighed 250.4 grams. The calculated volume of silica in the preform was 42.2 cubic centimeters. The calculated volume of fiber in the preform was 83.4 cubic centimeters.

The preform was placed in a mold cavity having twelve 0.25 inch diameter injection ports located around the inner diameter of the mold cavity. A reservoir was charged with type 1010 borosilicate glass (Specialty Glass, Oldsmar, Fla.). The tooling was heated at 15°-25° C. per minute under vacuum. At 1300° C., pressure was applied to the glass in the reservoir by means of a piston to force the glass through the injection ports into the mold cavity to impregnate the dry rigidized fiber preform. Piston travel was regulated to produce an initial injection rate of 8-15 cubic centimeters per minute of borosilicate glass. The rate decreased parabolically as the preform filled with the glass matrix material. The total time for glass injection was 80 minutes, and the maximum temperature was 1382° C. The glass impregnated fiber preform was cooled to room temperature over a 3 hour period to form a fiber reinforcing glass matrix composite ring.

The fiber reinforced glass matrix composite ring had an inner diameter of 5.744 inches, an outer diameter of 8.220 inches, and a height of 0.501 inches. The ring had a bulk density of 1.99 grams per cubic centimeter and an apparent porosity (i.e. measured by liquid displacement) of 1.3% The ring was tested by spinning. The ring survived spin testing up to 38,600 RPM, which corresponds to a hoop tensile stress of 642 MPa.

Although this invention has been shown and described with respect to detailed embodiments thereof, it will be understood by those skilled in the art that various changes in form and detail thereof may be made without departing from the spirit and scope of the claimed invention.

I claim:

1. A method for making a fiber reinforced glass matrix composite article, comprising:
    impregnating a fiber preform with a colloidal suspension to form a colloid-impregnated fiber preform, wherein the fiber preform comprises reinforcing fibers, the reinforcing fibers are disposed in selected relative orientations, and the colloidal suspension comprises inorganic particles suspended in a continuous medium,
    cooling the colloid-impregnated fiber preform to a temperature about equal to or below the freezing point of the continuous medium to precipitate the inorganic particles and form a rigidized fiber preform, removing the continuous medium from the rigidized fiber preform to form a dry rigidized fiber preform, impregnating the dry rigidized fiber preform with heated glass matrix material to form a glass impregnated rigidized fiber preform, and cooling the glass impregnated rigidized fiber preform to form the fiber reinforced glass matrix composite article, wherein the fiber reinforced glass matrix composite article comprises the reinforcing fibers within a glass matrix and the reinforcing fibers substantially remain in the selected relative orientations.

2. The method of claim 1 wherein the inorganic particles comprise silica, and continuous medium comprises water and the colloid-impregnated fiber preform is cooled to a temperature equal to or below about 0° C.

3. The method of claim 1 wherein the rigidized fiber preform is heated to remove the continuous medium by evaporation of the continuous medium.

4. The method of claim 1 wherein the rigidized fiber preform is subjected to subatmospheric pressure at a temperature equal to or below the freezing point of the continuous medium to remove the continuous medium by evaporation of the continuous medium.

5. The method of claim 1, wherein the glass matrix material comprises borosilicate glass and the reinforcing fibers comprise SiC fibers or graphite fibers.

* * * * *